United States Patent [19]

Lippincott

[11] Patent Number: 5,339,442
[45] Date of Patent: Aug. 16, 1994

[54] IMPROVED SYSTEM OF RESOLVING CONFLICTING DATA PROCESSING MEMORY ACCESS REQUESTS

[75] Inventor: Louis A. Lippincott, Roebling, N.J.

[73] Assignee: Intel Corporation, Santa Clara, Calif.

[21] Appl. No.: 954,743

[22] Filed: Sep. 30, 1992

[51] Int. Cl.[5] .......................................... G06F 13/364
[52] U.S. Cl. ........................... 395/725; 340/825.5; 370/85.6; 364/242.6; 364/242.7; 364/241.2; 364/241.3; 364/271.5; 364/DIG. 1
[58] Field of Search ............... 395/725, 325, 425, 166; 340/825.51, 825.5; 370/85.6, 85.2

[56] References Cited

U.S. PATENT DOCUMENTS

| | | | |
|---|---|---|---|
| 3,921,145 | 11/1975 | Emm et al. | 395/725 |
| 4,249,093 | 2/1981 | Henig | 307/522 |
| 4,375,639 | 3/1983 | Johnson, Jr. | 340/825.5 |
| 4,453,214 | 6/1984 | Adcock | 395/425 |
| 4,627,018 | 12/1986 | Trost et al. | 395/425 |
| 4,719,569 | 1/1988 | Ludemann et al. | 395/725 |
| 4,835,672 | 5/1989 | Zenk et al. | 364/200 |
| 5,168,570 | 12/1992 | Eckert et al. | 395/725 |
| 5,193,194 | 3/1993 | Gruender, Jr. et al. | 395/725 |
| 5,237,696 | 8/1993 | Best | 395/725 |
| 5,253,348 | 10/1993 | Scalise | 395/325 |
| 5,274,785 | 12/1993 | Kuddes et al. | 395/325 |

Primary Examiner—Gopal C. Ray
Attorney, Agent, or Firm—Carl L. Silverman; William H. Murray; James H. Dautremont

[57] ABSTRACT

A request arbitration device is provided for prioritizing requests in a data processing system. A series of requests may arrive at the arbitration device at differing arrival times. The requests are accumulated to form a set of requests which is applied to a priority decode without any information on their relative arrival times. The priority device applies a fixed predetermined priority scheme to these requests. Simultaneously with the prioritizing of the first set of requests by the priority decode, a second set of requests may arrive at different arrival times. The requests of this second set of requests are likewise accumulated by the arbitration logic of a present invention. When arbitration of the first set of requests is complete, the second set of requests is then applied to the priority decode, again without any information with respect to their relative arrival times. The second set of requests is prioritized according to the same fixed predetermined priority scheme as the first set.

3 Claims, 3 Drawing Sheets

IMPROVED SYSTEM OF RESOLVING CONFLICTING DATA PROCESSING MEMORY ACCESS REQUESTS

BACKGROUND OF THE INVENTION

1. Field of the Invention

This invention relates to the field of data processing systems and, in particular, to the field of arbitration of requests for access to a common memory in data processing systems.

2. Background Art

It is well known in the art to provide data processing systems wherein a number of data processing devices require access to a common memory. Additionally, it is known in the field of video image processing, which requires both encoded image data and decoded image data, to provide memories for storing both kinds of data for each of these various devices. In order to reduce the costs of such an image processing system it may be desirable to use a single memory to hold both the encoded image data and decoded image data of the various devices.

A memory of this type may be adapted for access by a source of compressed video data in order for the compressed data source to store the encoded data; for access by a decoding data processor in order to read the encoded data, decode it, store it; and also for access by a display processor in order to read the decoded data and display it. Since each of these devices accesses the common memory for a number of different purposes, there is a high likelihood of a conflict between them whenever the common memory is accessed for two different purposes at the same time.

One method for resolving conflicting memory access requests by the various devices is to use a fixed priority scheme in which each type of memory access from each device is assigned a fixed priority. In this method the type of pending request having the highest priority is processed first. A system of this type is disclosed in U.S. Pat. No. 4,564,915, entitled "YIQ Computer Graphics System", which is hereby incorporated by reference.

However, a fixed priority memory arbitration system may have disadvantages in some video signal processing system applications. For example, in the system described above the memory read request from the data decoding processor may have a higher priority than the memory write request from the data decoding processor. Under these conditions, when the output buffer of the decoding processor is full and a memory read operation is requested, the processor must wait until both the read and write operations have been processed before new data may be added to the output buffer.

If, however, the memory write operation has a higher priority than the memory read operation, the processor would only wait for the memory write operation. It can process data previously stored in an input buffer while the memory read operation is in progress. Any unnecessary delay in the operation of a video signal processor may preclude that processor from decoding the encoded data for an image quickly enough to produce a display with natural detail and motion. It may be desirable, therefore, for a video signal processor to have a flexible system for the arbitration of memory access conflicts which avoids unnecessary delay in the operation of the processor in some applications.

A more flexible arbitration scheme is disclosed in U.S. Pat. No. 5,088,053. U.S. Pat. No. 5,088,053 teaches a memory control system for a video signal processor which includes an input channel for reading data from a memory and an output channel for writing data into a memory. The memory control system includes circuitry coupled to the input channel and circuity coupled to the output channel for requesting both a memory operation with a normal priority and for requesting a memory operation with an urgent priority. A scheduling circuit for normal requests receives the normal priority requests provided by the input and output channel and schedules normal memory operations to satisfy these requests with substantially equal priority. Another scheduling circuit, an urgent scheduling circuit, receives the urgent requests from the input and output channels. When an urgent request is received, the urgent scheduling circuit disables the normal scheduling circuit and schedules memory operations according to a different priority scheme. However, this system does not permit easy access for high priority devices while guaranteeing that low priority devices are not locked out.

SUMMARY OF THE INVENTION

A request arbitration device is provided for prioritizing requests in a data processing system. A series of requests may arrive at the arbitration device at differing arrival times. The requests are accumulated to form a set of requests which is applied to a priority decode without any information on their relative arrival times. The priority device applies a fixed predetermined priority scheme to these requests. Simultaneously with the prioritizing of the first set of requests by the priority decode, a second set of requests may arrive at different arrival times. The requests of this second set of requests are likewise accumulated by the arbitration logic of a present invention. When arbitration of the first set of requests is complete, the second set of requests is then applied to the priority decode, again without any information with respect to their relative arrival times. The second set of requests is prioritized according to the same fixed predetermined priority scheme as the first set.

DETAILED DESCRIPTION OF THE INVENTION

Figure 1:
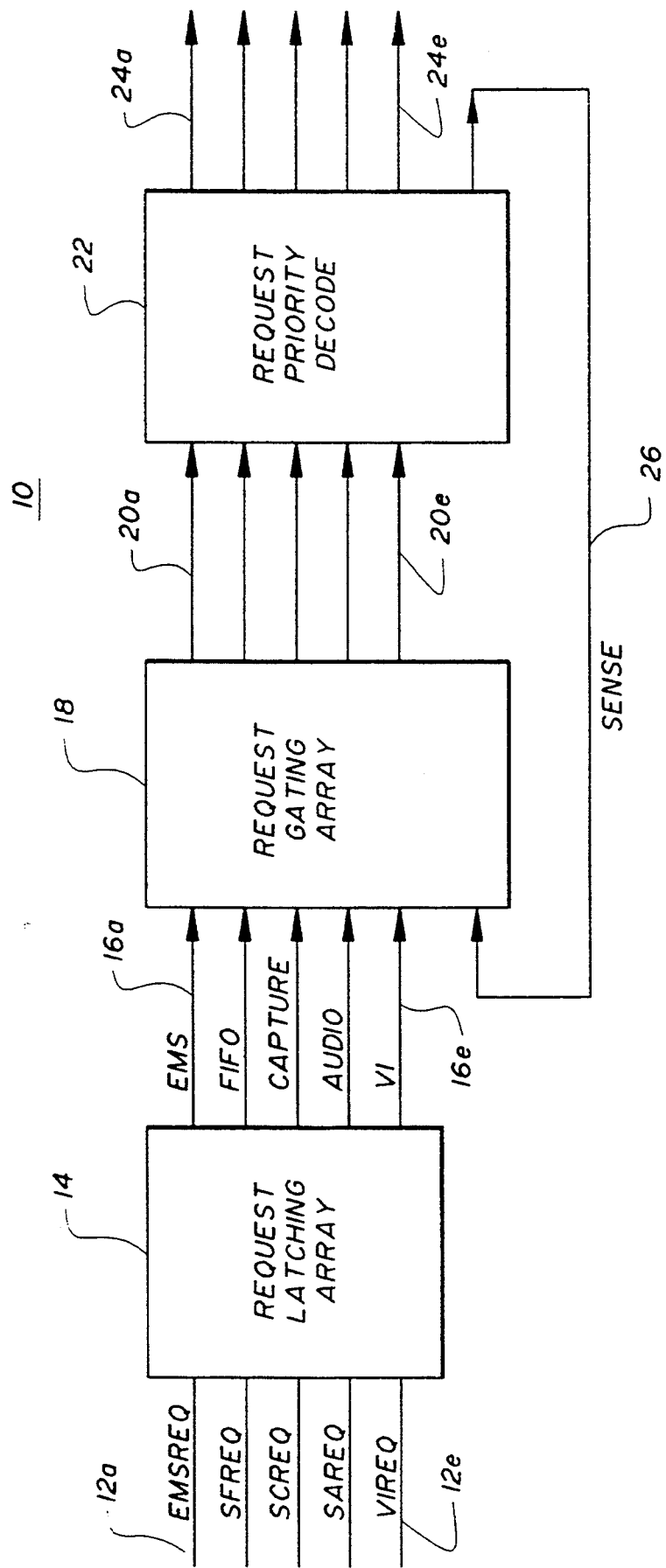
FIG. 1 shows a block diagram representation of the arbitration logic of the present invention.

Referring now to FIG. 1, there is shown a block diagram representation of memory access arbitration logic 10 of the present invention. Memory access arbitration logic 10 receives memory access requests from a multiplicity of data processing devices (not shown) by way of request input lines 12a-e. In accordance with the priority scheme of the present invention, memory access arbitration circuit 10 provides dedicated enable signals to the various requesting devices by way of output enable lines 24a-e.

Arbitration of memory access requests received on request input lines 12a-e is performed in accordance with the method of the present invention by first latching the requests in request latching network 14. The latched requests of request latching network 14 are applied to request gating array 18 by way of latched request lines 16a-e. The gated request signals of gating array 18 are applied to request priority decode 22 by way of gated request lines 20a-e. The gated requests applied by way of gated request lines 20a-e are then prioritized within request priority decode 22 according to a fixed predetermined priority scheme.

Requests which are received by request latching network 14 are thus not applied directly to request priority decode 22 within arbitration logic 10. The requests are synchronized within arbitration logic 10 by means of request latching network 14 and request gating array 18 prior to being applied to request priority decode 22. Thus, as requests arrive by way of request input lines 12a-e and are latched by latching network 14 prior to being applied to gate array 18, latching network 14 provides an accumulation of the memory access requests while providing no memory of the order in which the requests arrived. At some point, request gating array 18 is opened to permit all of the latched requests of request latching network 14 to be applied to priority decode 22 by way of gated request lines 20a-e.

Thus, request priority decode 22 merely receives the requests which accumulated within memory access arbitration logic 10 of the present invention. Priority decode 22 receives no information on the order in which the requests were applied to memory access arbitration logic 10 or request arbitration logic 10. Request priority decode 22 then processes the gated requests of gated request lines 20a-e strictly according to their relative priorities as assigned within the predetermined priority hierarchy.

In accordance with the gated requests of gated request lines 20a-e, and in accordance with the predetermined priority of priority decide 22, priority decode 22 then provides the arbitrated enable signals of output enable lines 24a-e. In this manner, the memory access requests received and accumulated within latching array 14 of arbitration logic 10 are arbitrated according to the predetermined priority scheme. The arbitrated enable signals of output enable lines 24a-a may then be used to enable, for example, various devices within a video processor system to allow the various devices to obtain access to a common memory.

While request priority decode 22 is in the process of arbitrating one set of gated requests within memory access arbitration logic 10, new memory access request signals may be applied to latching network 14 by way of request input lines 12a-e. These new memory requests are accumulated by request latching network 14 as previously described. It will be understood that this accumulation of a new set of memory access requests occurs simultaneously with the arbitration being performed by request priority decode 22 because each of the new requests is latched within latching network 14 as it arrives.

When service of all of the previously gated requests is completed by request priority decode 22, request priority decode 22 is prepared to receive the newly latched requests which reside within request latching network 14. These newly received requests are then gated from latched request lines 16a-e through request gating array 18 and onto gated request lines 20a-e. Thus the newly accumulated requests are applied by way of lines 20a-e to request priority decode 22 for prioritizing. The relative priorities of this new set of requests are then determined according to the same fixed priority scheme within request priority decode 22 as the previous set.

Thus, as previously described, all pending requests gated within arbitration logic 10 of the present invention by gate array 18 are decoded by request priority decode 22 prior to the decoding of any new requests which may have arrived later. Thus, while the lowest priority request of the pending requests will be acknowledged last of any pending requests being serviced within priority decode 22, it will be processed before any higher priority request which may be received before it is serviced within priority decode 22. This permits higher priority requests to move more quickly through memory access arbitration logic 10 while preventing low priority requests from getting locked out by frequently reoccurring higher priority requests.

Figure 2:
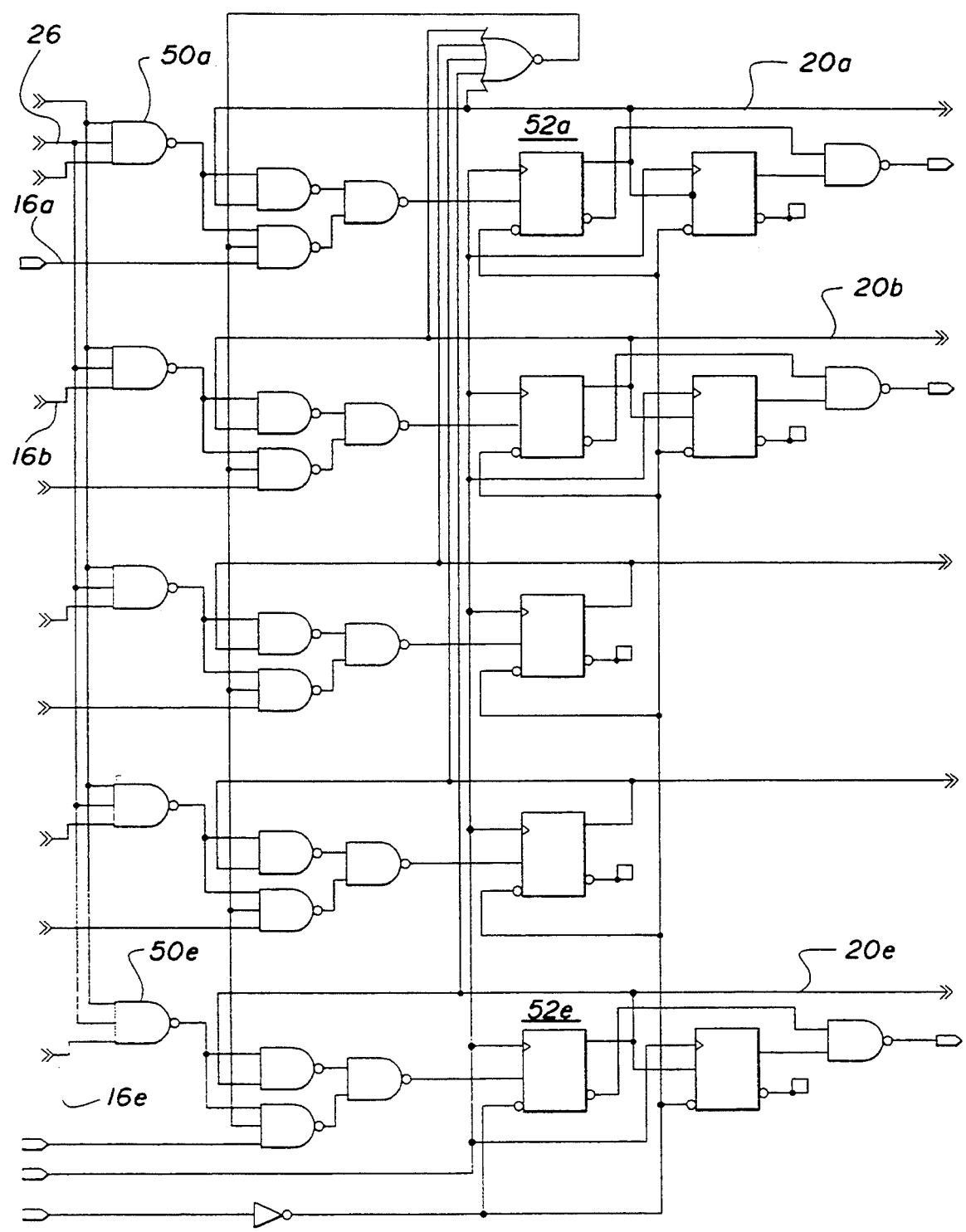
FIG. 2 shows a more detailed schematic representation of the gate array of the arbitration logic of FIG. 1.

Referring now to FIG. 2, there is shown a more detailed schematic representation of request gating array 18 of memory access arbitration logic 10 of the present invention. Within request gating array 18, the latched request signals of request input lines 16a-e are received by gate array input NOR gates 50a-e. Gate array input NOR gates 50a-e are also controlled by sense line 26 which feeds back from request priority decode 22 to indicate that at least one request signal has been sensed within memory access arbitration logic 10.

The outputs of gate array input NOR gates 50a-e are applied to gates 52a-e for gating through to priority decode 22. Gates 52a-n receive the outputs of NOR gates 50-a-n and provide gates request signals on gated requests lines 20a-n in a manner well understood by those skilled in the art.

Figure 3:
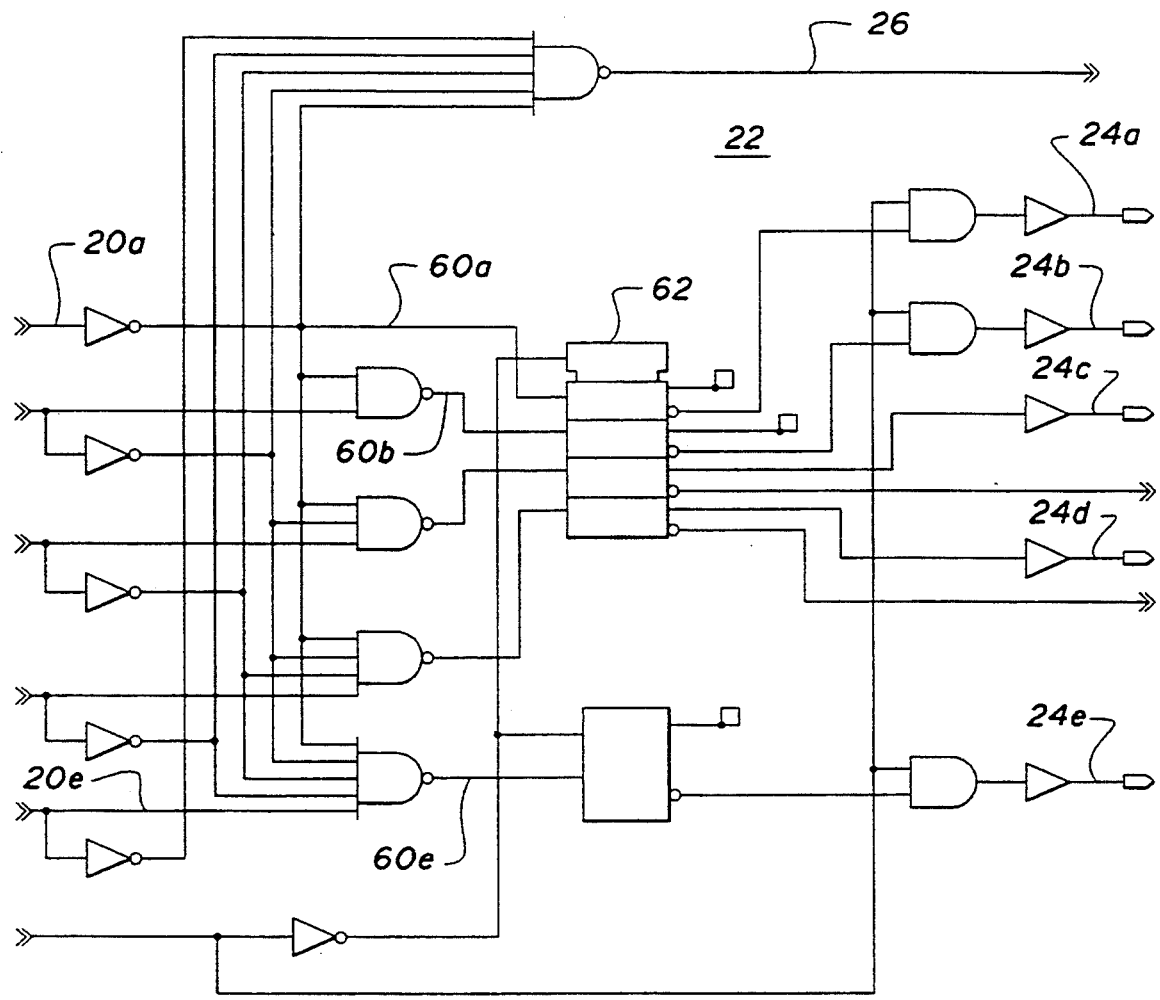
FIG. 3 shows a more detailed schematic representation of the priority decode of the arbitration logic of FIG. 1.

Referring now to FIG. 3, there is shown a more detailed representation of request priority decode 22. Request priority decode 22 receives gated request signals along with their inverse from request gating array 18 by way of gated request lines 20a-e as previously described. The request signals of gated request lines 20a-n are applied to device enable 62 by way of inputs 60a-e. Input 60a is applied directly to device enable 62. Thus if there is a request on input 60a it is serviced first. The signals of inputs 60b-e are determined according to NOR gates with an increasing number of inputs. A request on input 60b is serviced only when the input of input 60a is not high. A request on input 60c is serviced only when requests corresponding to inputs 60a, b are not present, and so on. However, it will be understood by those skilled in the art, that any method of establishing a fixed predetermined priority between the gated request signals of lines 20a-e may be used in request priority decoder 22. Enable device 62 provides the enable signals determined in this manner on lines 24a-e as previously described.

Figure 4:
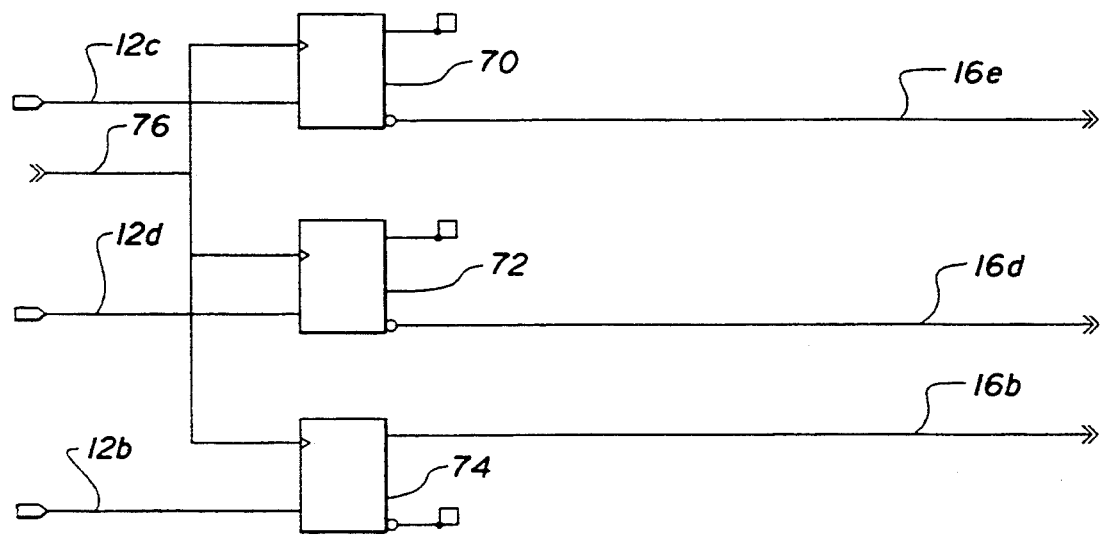
FIG. 4 shows a more detailed schematic representation of a portion of the request latching array of the arbitration logic of FIG. 1.

Referring now to FIG. 4, there is shown a portion of request latching array 14. As memory access requests arrive on input lines 12b,c,d of request latching array 14, they are latched into flip flops 70, 72, 74 under the control of clock signal 76 which is applied to all three flip flops 70, 72, 74 simultaneously. The outputs of flip flops 70, 72, 74 are applied to latched requests lines 16b,c,d and are thereby applied to request gating array 18 as previously described.

While this invention has been described with reference to a specific and particularly preferred embodiments thereof, it is not limited thereto and the appended claims are intended to be construed to encompass not only the specific forms and variants of the invention shown but to such other forms and variants as may be devised by those skilled in the art without departing from the true scope of this invention.

What is claimed is:

1. A request arbitration device in a data processing system having a plurality of request generating devices, comprising:

single receiving means for first receiving a first plurality of requests arriving at differing arrival times within a first time period;

single priority means responsive to an output from said single receiving means indicative of the content of said first plurality of requests for first prioritizing the requests of said first plurality of requests independently of a plurality of arrival times during a second time period, said second time period occurring later than said first time period; and, said receiving means being adapted for second receiving a second plurality of requests arriving at said plurality of arrival times within said second time period, whereby said data processing system handles said first plurality of requests prior to and independent of said second plurality of requests.

2. The request arbitration device of claim 1, wherein said receiving means comprises latching means for latching said first plurality of requests arriving at said differing arrival times and providing a plurality of latched signals independently of said differing arrival times.

3. The request arbitration device of claim 2, further comprising request gating means for receiving said latched request signals and applying said latched request signals to said priority means after the end of said first time period.

* * * * *